No. 726,449. PATENTED APR. 28, 1903.
J. McKEE.
CLOTHES LINE REEL.
APPLICATION FILED JUNE 2, 1902.
NO MODEL.
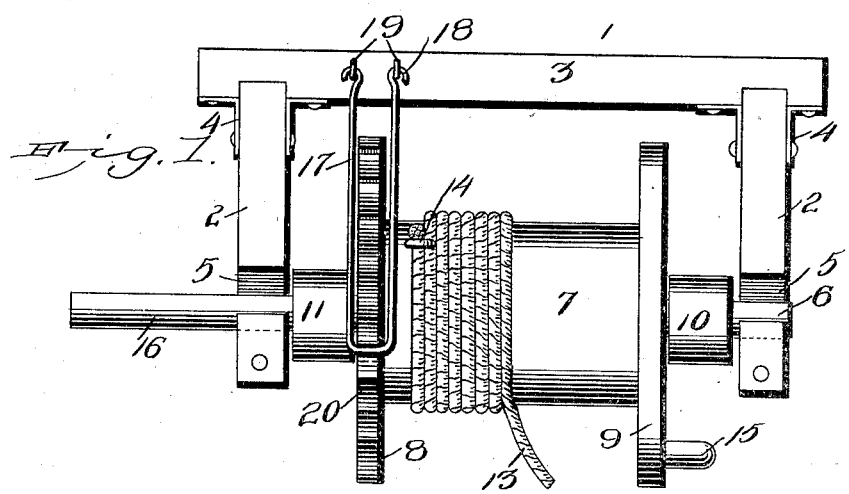
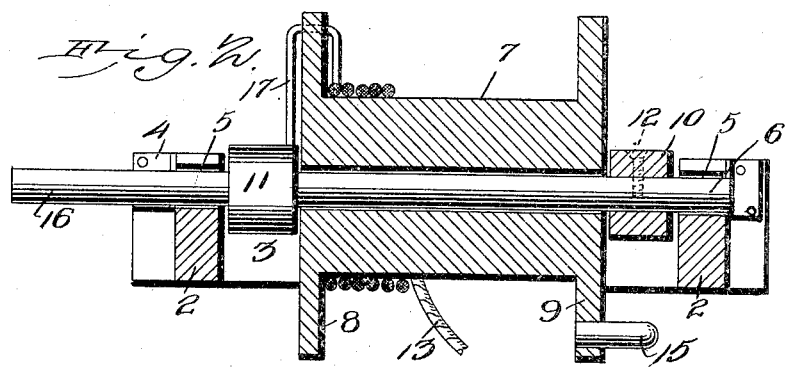
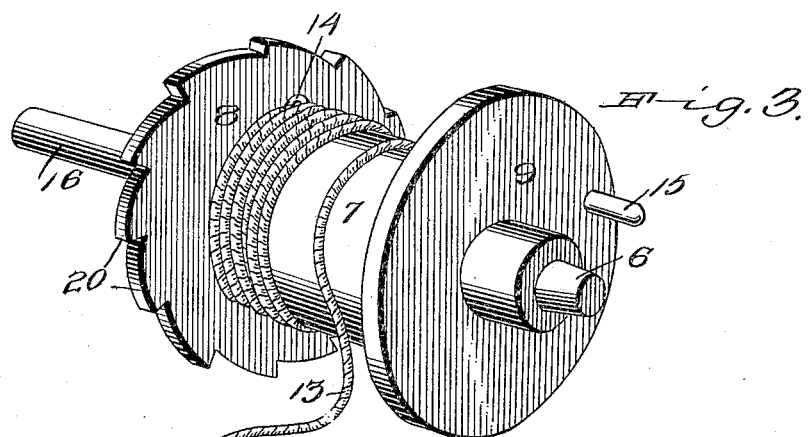
Witnesses
John McKee, Inventor.
by
Attorneys

UNITED STATES PATENT OFFICE.

JOHN McKEE, OF WARREN, OHIO.

CLOTHES-LINE REEL.

SPECIFICATION forming part of Letters Patent No. 726,449, dated April 28, 1903.

Application filed June 2, 1902. Serial No. 109,945. (No model.)

*To all whom it may concern:*

Be it known that I, JOHN McKEE, a citizen of the United States, residing at Warren, in the county of Trumbull and State of Ohio, have invented a new and useful Clothes-Line Reel, of which the following is a specification.

The invention relates to improvements in clothes-line reels.

The object of the present invention is to improve the construction of clothes-line reels and to provide a simple, inexpensive, and efficient device adapted to enable a clothes-line to be readily handled in putting it up and taking it down and capable of enabling it to be readily strained to the desired tension.

The invention consists in the construction and novel combination and arrangement of parts hereinafter fully described, illustrated in the accompanying drawings, and pointed out in the claims hereto appended.

In the drawings, Figure 1 is a plan view of a clothes-line reel constructed in accordance with this invention. Fig. 2 is a transverse sectional view of the same. Fig. 3 is a detail view of the removable drum and the shaft or spindle.

Like numerals of reference designate corresponding parts in all the figures of the drawings.

1 designates a horizontal bracket designed to be secured to a suitable support and composed of sides 2 and a connecting cross-bar 3, which is recessed to receive the inner ends of the sides and which is secured to the same by L-shaped plates or knees 4; but instead of constructing the bracket of wood it may be made of any other suitable material and can consist of a single casting. The sides of the bracket are provided with open bearing-recesses 5, receiving a shaft or spindle 6 and having extended outer portions, as illustrated in dotted lines in Fig. 1 of the drawings, to receive the said shaft or spindle, whereby the latter is held in the bracket-bearings when the line is under tension.

Mounted upon the shaft or spindle for rotation is a drum 7, consisting of a central body portion and side flanges 8 and 9 and arranged between collars 10 and 11, which are secured to the shaft or spindle by suitable fastening devices 12, whereby the drum is spaced from the sides of the bracket. The drum receives a clothes-line 13, which is secured at one end to the said drum by means of an eye or staple 14 and which is adapted to be wound around the drum and to be unwound therefrom, as hereinafter explained. The flange or side 9 of the drum is provided with an eccentrically-arranged handle 15, adapted to permit the drum to be readily rotated on the shaft or spindle. The shaft or spindle 6 is extended at one end to form a handle 16, and in putting up the line the shaft and the drum are carried by the operator, who grasps the handle of the shaft or spindle. The outer end of the line is attached to a suitable support, and as the operator walks away from the same, holding the handle 16 of the shaft or spindle, the line will unwind from the drum or spool, which rotates freely on the said shaft or spindle. The line is placed on pulleys or supports to stretch it between the desired points, and the shaft or spindle is then replaced in the bearings of the bracket, and the drum or spool is rotated sufficiently by the handle 15 to stretch the clothes-line to the desired tension. The clothes-line is held at the desired tension by a pawl or dog 17, consisting of a loop of oblong shape provided at the inner or rear ends of its sides with eyes 18 and hinged to the back of the bracket and located above and adapted to rest upon the flange 8 of the spool or drum. The eyes of the pawl or dog are linked into staples or screw-eyes 19 of the bracket 1. The flange 8 is provided at its periphery with teeth 20, forming a ratchet-wheel, each tooth being sloped at one side and a shoulder being formed at the other, as clearly shown in Fig. 3. In taking down the clothes-line the spool or drum and the shaft or spindle are removed from the bracket, and the said shaft or spindle is held in one hand while the spool or drum is rotated to wind up the line. The spool or drum may then be stored away to protect the line from the weather and to keep it clean. The handle for rotating the spool or drum is mounted independently of the shaft or spindle and is spaced from the adjacent side of the bracket to clear the same by the collar 10.

It will be seen that the clothes-line reel is exceedingly simple and inexpensive in construction, that the spool or drum is adapted to rotate on the shaft or spindle, and that the shaft or spindle and the spool or drum are removable from the bracket to enable the line to be conveniently put up and taken down.

What I claim is—

1. A clothes-line reel comprising a bracket, a shaft or spindle removably supported by the bracket and provided with an extension forming a handle and a spool or drum loosely mounted on the spindle or shaft and provided with a handle for enabling it to be rotated independently of the spool or shaft and spaced from the sides of the bracket to permit its handle to clear the said bracket, substantially as described.

2. A clothes-line reel comprising a bracket, a spindle or shaft removably arranged within the bracket and extended beyond the same to form a handle, a spool or drum loosely mounted on the spindle or shaft and provided with a handle for enabling it to be rotated independently of the same, and collars mounted on the shaft or spindle for spacing the spool or drum from the bracket, substantially as described.

3. A clothes-line reel comprising a bracket having open bearings, a shaft or spindle detachably mounted in the open bearings of the bracket and provided at one side of the reel with a grip or handle, and a drum loosely mounted on the shaft or spindle for rotation independently thereof and provided with a handle located at the side of the reel opposite that at which the grip or handle of the shaft or spindle is arranged to permit the drum to be rotated with one hand while the shaft or spindle is carried in the other, said drum being also capable of rotation on the shaft or spindle while the latter is in the open bearings of the said bracket, substantially as described.

In testimony that I claim the foregoing as my own I have hereto affixed my signature in the presence of two witnesses.

JOHN McKEE.

Witnesses:
JOHN G. KIRKPATRICK,
H. H. KOONCE.